US006982845B2

(12) United States Patent
Kai et al.

(10) Patent No.: US 6,982,845 B2
(45) Date of Patent: Jan. 3, 2006

(54) MAGNETIC RECORDING APPARATUS AND MAGNETIC RECORDING METHOD

(75) Inventors: Tadashi Kai, Kanagawa-ken (JP); Masayuki Takagishi, Kanagawa-ken (JP); Masashi Sahashi, Kanagawa-ken (JP); Junichi Akiyama, Kanagawa-ken (JP); Hitoshi Iwasaki, Kanagawa-ken (JP); Akira Kikitsu, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 227 days.

(21) Appl. No.: 10/400,532

(22) Filed: Mar. 28, 2003

(65) Prior Publication Data

US 2003/0214742 A1    Nov. 20, 2003

(30) Foreign Application Priority Data

Mar. 29, 2002    (JP)    ............................. 2002-097446

(51) Int. Cl.
  *G11B 5/02*    (2006.01)
(52) U.S. Cl. ............................ 360/59; 360/55; 360/15; 360/16; 360/17; 369/13.01; 369/13.02
(58) Field of Classification Search ................. 360/55, 360/59, 15–17, 61, 324.1, 324.11, 324.12, 360/321; 369/13.01, 126, 118, 171, 97, 173, 369/174

See application file for complete search history.

(56) References Cited

U.S. PATENT DOCUMENTS

| 4,599,658 A | * | 7/1986 | Saitoh et al. ................. 360/59 |
| 5,289,455 A | * | 2/1994 | Kuroda et al. ............... 369/126 |
| 6,532,164 B2 | * | 3/2003 | Redon et al. ................. 365/97 |
| 6,809,900 B2 | * | 10/2004 | Covington .................. 360/126 |
| 2003/0053238 A1 | | 3/2003 | Kai et al. |

OTHER PUBLICATIONS

"Spin-Polarized tunneling Storage Device", Sep. 1, 1987, IBM Technical Disclosure Bulletin, vol. No. 30, Issue No. 4, p. 1858.*

Albert et al., "Spin-polarized current switching of a Co thin film nanomagnet", Dec. 4, 2000, Applied Physics Journal, vol. 77, No. 23, pp. 3809-3811.*

F.J. Albert et al., "Spin-Polarized Current Switching of a Co Thin Film Nanomagnet", Applied Physics Letters, vol. 77, No. 23, pp. 3809-3811, (Dec. 2000).

* cited by examiner

Primary Examiner—David Hudspeth
Assistant Examiner—Natalia Figueroa
(74) Attorney, Agent, or Firm—Finnegan, Henderson, Farabow, Garrett & Dunner, L.L.P.

(57) ABSTRACT

A magnetic recording apparatus comprises a magnetic field impression unit, a current supplying unit and a controlling unit t. The magnetic field impression unit impresses a magnetic field to a magnetic recording medium. The current supplying unit supplies a current to the magnetic recording medium. The controlling unit makes the current supplying unit supply the current to the magnetic recording medium while making the magnetic field impression unit impress the magnetic field to at least a unit of a magnetic recording unit of the magnetic recording medium. Thus, a information is recorded magnetically by making a direction of a magnetization of the magnetic recording unit of the magnetic recording medium in a predetermined direction.

19 Claims, 15 Drawing Sheets

MAGNETIC RECORDING APPARATUS AND MAGNETIC RECORDING METHOD

CROSS-REFERENCE TO RELATED APPLICATIONS

This application is based upon and claims the benefit of priority from the prior Japanese Patent Application No. 2002-097446, filed on Mar. 29, 2002; the entire contents of which are incorporated herein by reference.

BACKGROUND OF THE INVENTION

This invention relates to a magnetic recording apparatus and a magnetic recording method, and more particularly, to a magnetic recording apparatus and a recording method which realize a super-high-density magnetic recording that exceed the thermal-agitation limit of a recording medium.

With improvement in the processing speed of a computer in recent years, magnetic memory storage, such as HDD (Hard Disk Drive) which performs recording and reproduction function of information or data, is needed to have a higher recording density and a higher operating speed. However, it is said that there is a physical limit in a recording density.

By using the conventional method, it is thought to be difficult to continue meeting the demand of high speed and high recording density in the future.

In the case of HDD apparatus, the magnetic recording medium with which information is recorded has a magnetic layer containing the aggregate of fine magnetic particles.

In order to perform a high-density recording, it is necessary to make the magnetic domains smaller, which are recorded on the magnetic layer. In order to be able to distinguish small recording magnetic domains, it is required for the boundaries of the magnetic domains to be smooth enough.

For that purpose, it is necessary to make minute magnetic particles which are contained in the magnetic layer.

If magnetization reversal carries out a chain even to an adjoining magnetic particle, "disorder" of the boundary of a magnetic domain is caused. Therefore, the magnetic particles need to be magnetically divided each other by a non-magnetic body so that an exchange-coupling interaction may not work between the magnetic particles. Besides, from a viewpoint of the magnetic interaction between a recording head and a medium, it is also necessary to make the thickness of the magnetic layer thin enough in order to perform a high-density recording.

Thus, it is necessary to make still smaller volume of the magnetization reversal unit in a magnetic layer from the above request. If the above-mentioned demand is completely filled, the volume of the magnetization reversal unit in a magnetic layer will ultimately become almost equal to a volume of the magnetic particle. However, if a magnetization reversal unit is made minute, the magnetic anisotropy energy (a product $Ku \times Va$ where $Ku$ is a density of magnetic anisotropy energy and $Va$ is a volume of magnetization reversal unit) of the unit will become smaller than thermal-agitation energy. Therefore, it becomes impossible for a magnetic reversal unit to hold the magnetic domains.

This is the thermal-agitation phenomenon which serves as the main factor of the physical limit (called a "thermal agitation limit") of a recording density.

In order to prevent undesired reversal of the magnetization by the thermal-agitation, the density of magnetic anisotropy energy $Ku$ may preferably be enlarged. However, at the time of recording, i.e. when performing high-speed magnetization reversal operation in the case of the above-mentioned HDD medium, a coercive force $Hcw$ is proportional to $Ku$ mostly. Therefore, by using the magnetic field which the conventional recording head may generate, recording will become impossible, if $Ku$ is enlarged.

In order to prevent reversal of the magnetization by the thermal-agitation, enlarging volume $Va$ of a magnetization reversal unit is also considered. However, if $Va$ is enlarged by increasing the size of the magnetic particle in a medium, high-density recording cannot be attained. Besides, if $Va$ is enlarged by thickening film thickness of the recording layer, a magnetic field from the head will not fully reach the lower part of the recording layer. Therefore, magnetization reversal will not take place and high-density recording cannot be attained too.

Furthermore, since it is difficult to produce recording and a reproducing head in minute size, it is becoming difficult to attain high-density recording.

According to the situation explained above, there are many problems in the case of the conventional recording and reproducing method using the recording magnetic field from the magnetic recording head, and detecting a stray magnetic field from a recorded pattern by a reproducing head. Therefore, in order overly to attain high-density recording, it is necessary to newly develop recording and reproducing method using an electrical current etc.

SUMMARY OF THE INVENTION

According to an embodiment of the invention, there is provided a magnetic recording apparatus comprising: a magnetic field impression unit that impresses a magnetic field to a magnetic recording medium; a current supplying unit that supplies a current to the magnetic recording medium; and a controlling unit that makes the current supplying unit supply the current to the magnetic recording medium while making the magnetic field impression unit impress the magnetic field to at least a unit of a magnetic recording unit of the magnetic recording medium, thereby record a information magnetically by making a direction of a magnetization of the magnetic recording unit of the magnetic recording medium in a predetermined direction.

According to other embodiment of the invention, there is provided a magnetic recording apparatus comprising: a magnetic recording medium having a first magnetic layer and a second magnetic layer; a magnetic field impression unit that impresses a magnetic field to the first magnetic layer; a current supplying unit that supplies a current to the second magnetic layer through the first magnetic layer; and a controlling unit that makes the current supplying unit supply the current to the second magnetic layer through the first magnetic layer while making the magnetic field impression unit impress the magnetic field to the first magnetic layer to direct a magnetization of the first magnetic layer in a predetermined direction, thereby making a direction of a magnetization of the second magnetic layer in a direction corresponding to the direction of the magnetization of the first magnetic layer.

According to other embodiment of the invention, there is provided a magnetic recording method comprising: impressing a magnetic field to a first magnetic layer to direct a magnetization of the first magnetic layer; supplying a current to a second magnetic layer of the magnetic recording medium through the first magnetic layer; and making a direction of a magnetization of the second magnetic layer in a direction corresponding to the direction of the magnetization of the first magnetic layer thereby recording an information magnetically.

According to the embodiment of the invention, the high-density recording exceeding a thermal-agitation limit becomes realizable by writing in magnetization of a record layer by the current whose spin is polarized by the spin control layer. As a result, it becomes possible to offer a magnetic recording apparatus in which magnetic recording and reproduction of high sensitivity is possible, and the merit on industry is great.

BRIEF DESCRIPTION OF THE DRAWINGS

The present invention will be understood more fully from the detailed description given herebelow and from the accompanying drawings of the embodiments of the invention. However, the drawings are not intended to imply limitation of the invention to a specific embodiment, but are for explanation and understanding only.

In the drawings.

DETAILED DESCRIPTION

The basic principle of the embodiment of the invention is that a current supplied from a current supplying means is changed into a spin-polarized current by passing it through a high-polarized spin control layer from a probe, and a magnetization of a recording layer is reversed by using the spin-polarized current. The direction of magnetization to record is controlled by controlling a magnetization of the high-polarized spin control layer by the magnetic field from a magnetic head. Reproduction is performed using the giant magnetoresistance effect according to the relative angle of the magnetization of the high-polarized spin control layer and the magnetization of the recording layer.

Some embodiments of the invention will now be explained below with reference to the drawings.

Figure 1:
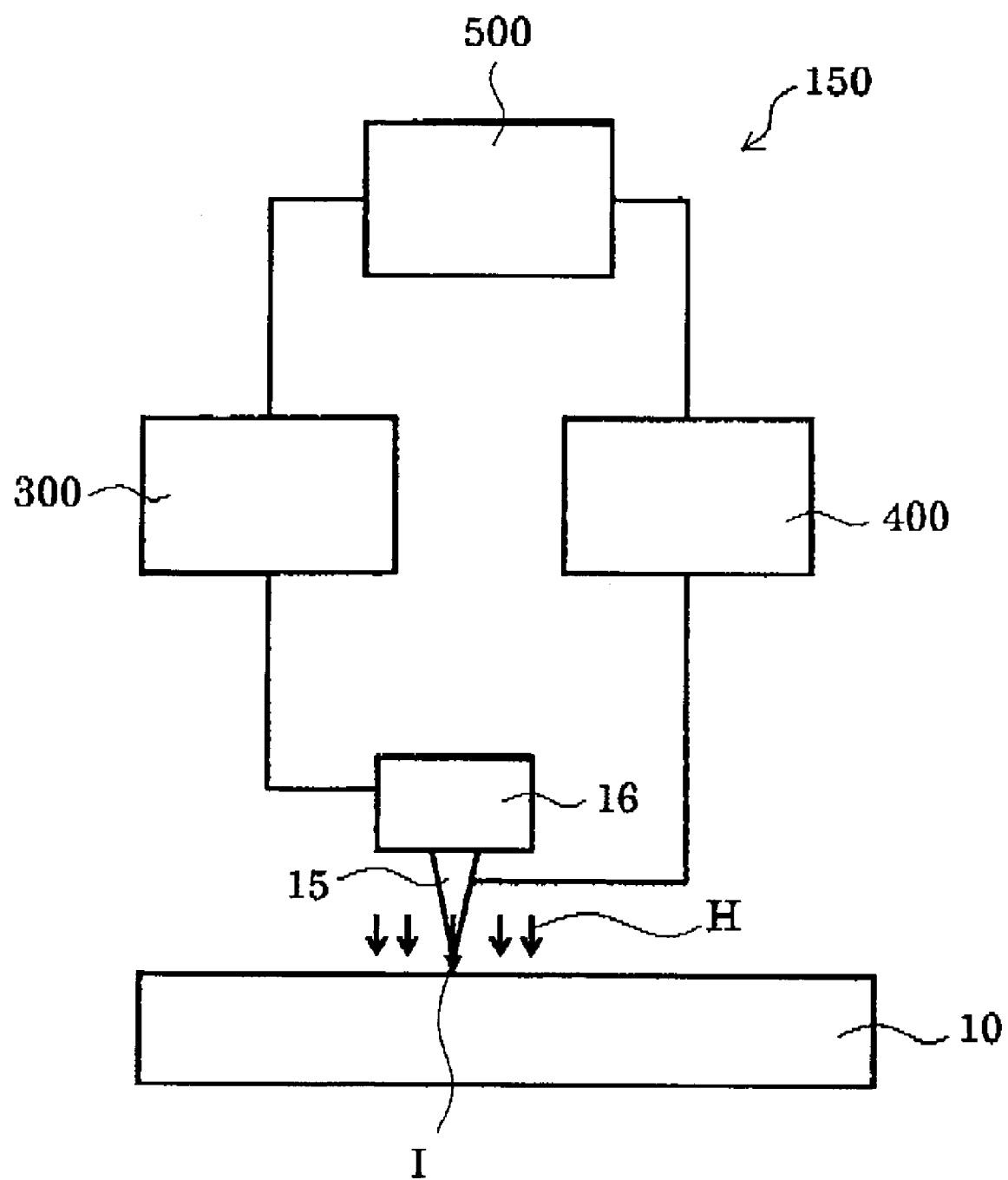
FIG. 1 is a block diagram that illustrates the principal part of the magnetic recording apparatus according to an embodiment of the invention.

FIG. 1 is a block diagram that illustrates the principal part of the magnetic recording apparatus according to an embodiment of the invention. The magnetic recording apparatus 150 according to the embodiment has the magnetic field impression circuit 300, the current supplying circuit 400 and the control part 500.

The magnetic field impression circuit 300 is connected to a magnetic head 16, and the magnetic field impression circuit 300 impresses a magnetic field H to the magnetic recording medium 10. The "magnetic field impression unit" recited in the appended claims may include the magnetic head 15 and the magnetic field impression circuit 300.

The current supplying circuit 400 is connected to a probe 15, and the current supplying circuit 400 passes current I to the magnetic recording medium 10. The "current supplying unit" recited in the appended claims may include the current supplying circuit 400 and the probe 15

The control part 500 controls these magnetic field impression part 300 and the current supplying part 400. The magnetic recording medium 10 may be formed fixed as a part of the magnetic recording apparatus 150. Alternatively, the magnetic recording medium 10 may be so-called "removable."

FIGS. 2A through 3C are conceptual figures that illustrate the principle of the magnetic recording method according to an embodiment of the invention. That is, these figures are schematic sectional views which express the magnetic recording medium 10, the magnetic head 16 and electronic irradiation means using the probe 15. The magnetic recording medium 10 used in the embodiment has the structure which laminated the magnetic recording layer 12, the intermediate layer 13, and the high-polarized spin control layer 14 on the electrode layer 11. The probe 15 as an electronic irradiation means is provided on the side of the high-polarized spin control layer of this magnetic recording medium. The probe 15 and the magnetic recording medium 10 may not touch each other, or may touch each other.

Moreover, on the magnetic recording medium 10, the recording head 16 as a magnetic field impression means is provided. A minute magnetization reversal portion can be formed in a recording layer 12 by the local electronic irradiation by the probe 15, and magnetic field impression by the recording head 16. The probe 15 may be integrated with the recording head 16.

In the magnetic recording apparatus of the embodiment, when performing a recording, i.e. writing of information, it is carried out as shown in FIGS. 2A through 3C.

Figure 2A:
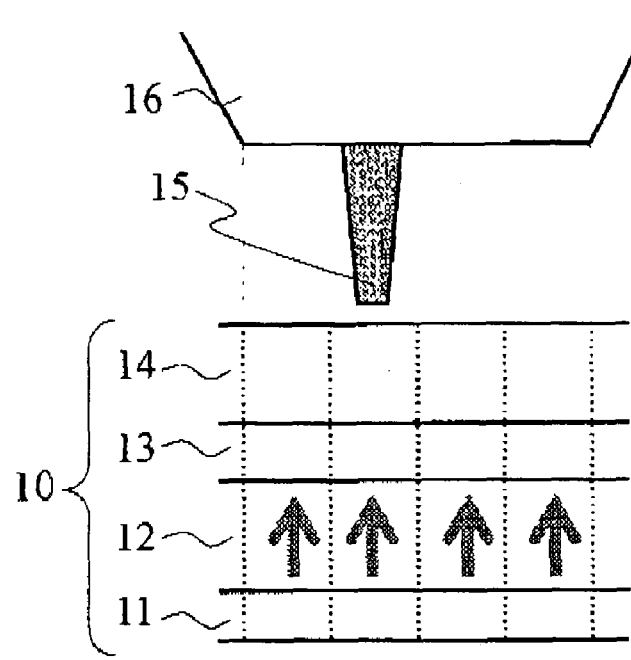
FIGS. 2A through 3C are conceptual figures that illustrate the principle of the magnetic recording method according to an embodiment of the invention.

FIG. 2A shows an initial state where all magnetization of the magnetic recording layer 12 has turned to the upward direction. At this stage, the magnetization direction of the spin-polarization control layer 14 is not appointed.

Figure 2B:
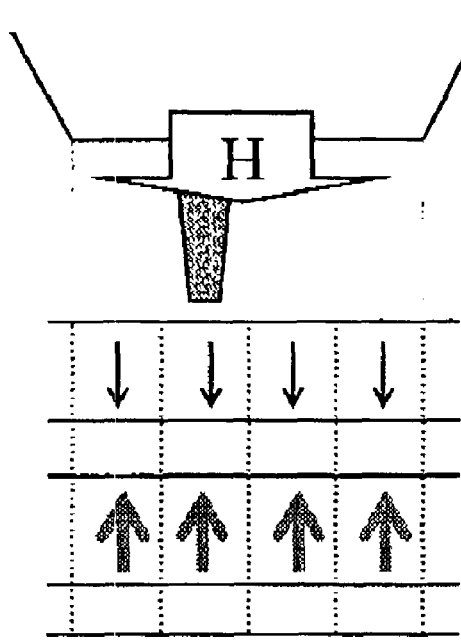

Next, as shown in FIG. 2B, a downward magnetic field is emitted from the recording head 16, and magnetization of the high-polarized spin control layer 14 is made to turn downward. In the example shown in the figures, the magnetic field is irradiated to a region including four record bits. Magnetization of the magnetic recording layer 12 is not affected only by the magnetic field from the recording head 16.

Figure 2C:
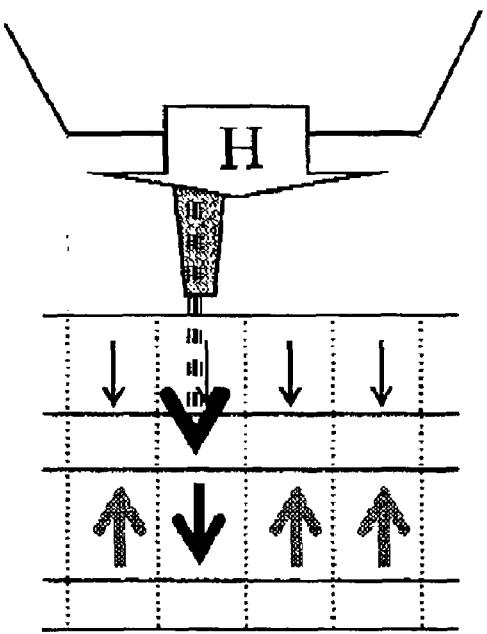

Next, as shown in FIG. 2C, the probe 15 supplies electrons to the recording medium 10. The spin of the supplied electrons is polarized to a specific direction (downward in the figure) in the high-polarized spin control layer 14. When these spin-polarized electrons pass the magnetic recording layer 12, these electrons turn the direction of the magnetization M of the magnetic recording layer 12 in a predetermined direction according to the direction of the spin.

Figure 3A:
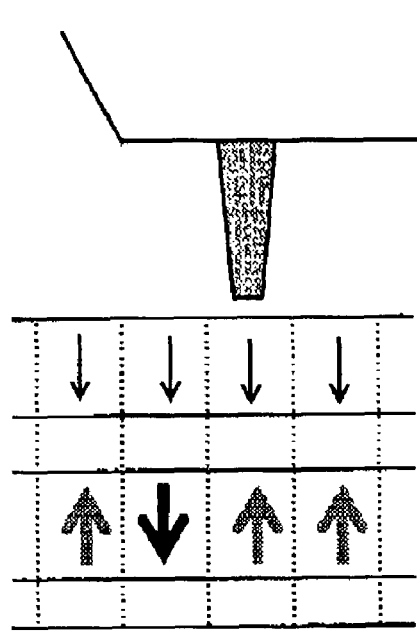

Next, as shown in FIG. 3A, the recording head 16 and the probe 15 are moved in order to write in the following bit. Although the recording head 16 and the probe 15 are moved in the example shown in these figures, the magnetic recording medium 10 may be moved alternatively.

Figure 3B:
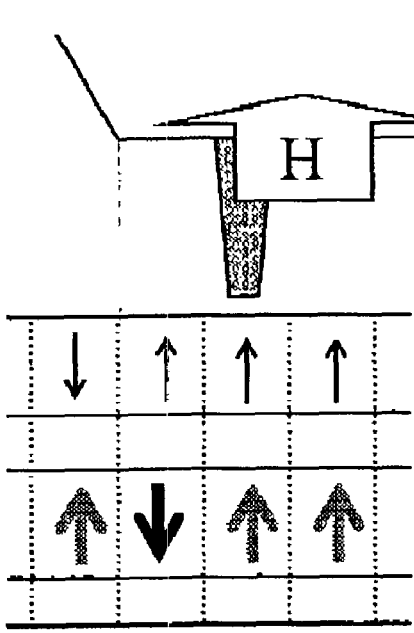
Figure 3C:
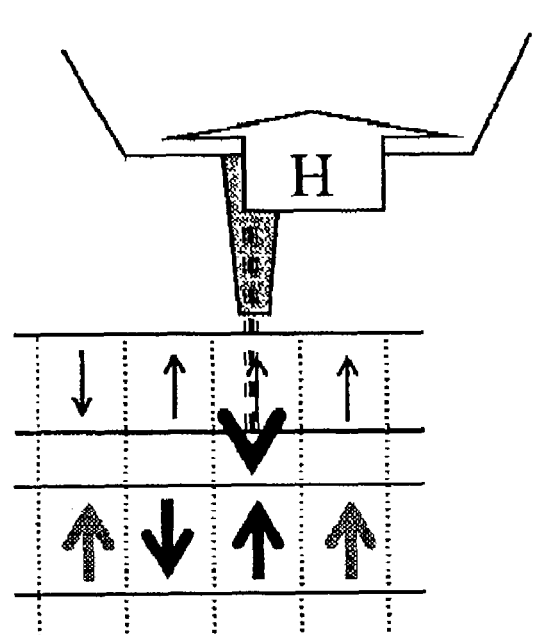

In FIG. 3B, an upward magnetic field is irradiated from the recording head 16 and the magnetization of the high-polarized spin control layer 14 is turned upward in order to record upward bit. Then, as shown in FIG. 3C, electrons are supplied towards the recording medium 10 from the probe 15, and magnetization of the magnetic record layer 12 is recorded upward.

As explained above, the high-polarized spin control layer 14 provided in the magnetic recording medium 10 has the function which transforms the current supplied from the probe 15 into the spin-polarized current. And when the spin-polarized current exceeds a certain threshold, magnetization of the magnetic recording layer 12 can be reversed. This threshold depends on the anisotropic magnetic field Hk. Moreover, it is dependent also on an external magnetic field H and saturation magnetization Ms.

Figure 4:
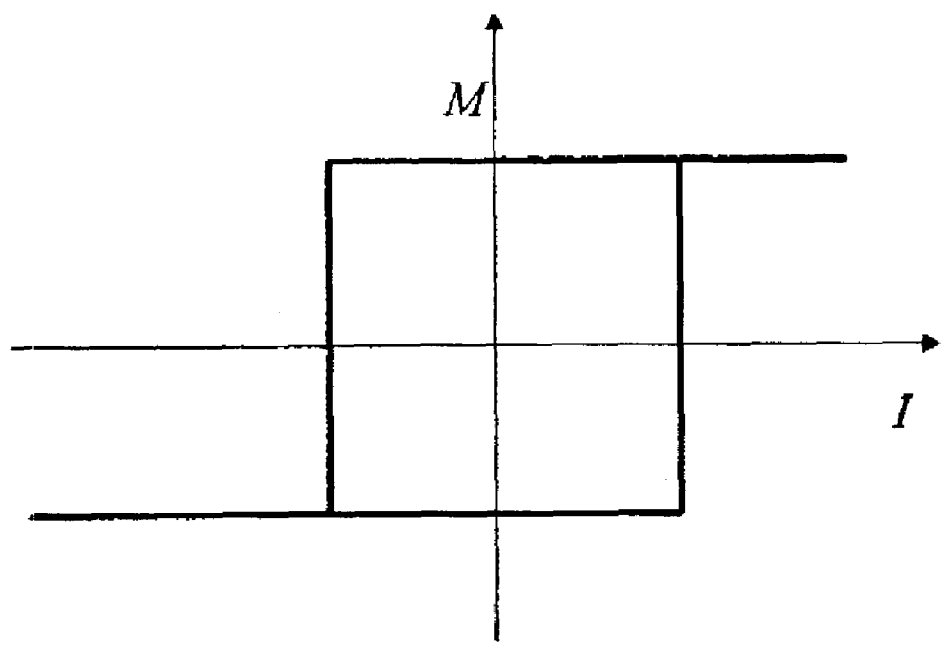
FIG. 4 is a graphical representation showing the ideal current-magnetization curve of the recording layer 12.

FIG. 4 is a graphical representation showing the ideal current-magnetization curve of the recording layer 12. That is, the horizontal axis of the graph expresses the spin-polarized current supplied to the recording layer 12, and a vertical axis expresses the magnetization M of the recording layer. As shown in this figure, this current-magnetization curve shows the similar behavior as MH curve of the usual ferromagnetic substance measured by VSM etc. That is, if a threshold value with spin-polarized current I is exceeded, Magnetization M will arise.

On the other hand, this current threshold value depends on an external magnetic field. That is, the current-magnetization curve illustrated in FIG. 4 may be shifted in the direction of a horizontal axis by an external magnetic field.

Figure 5:
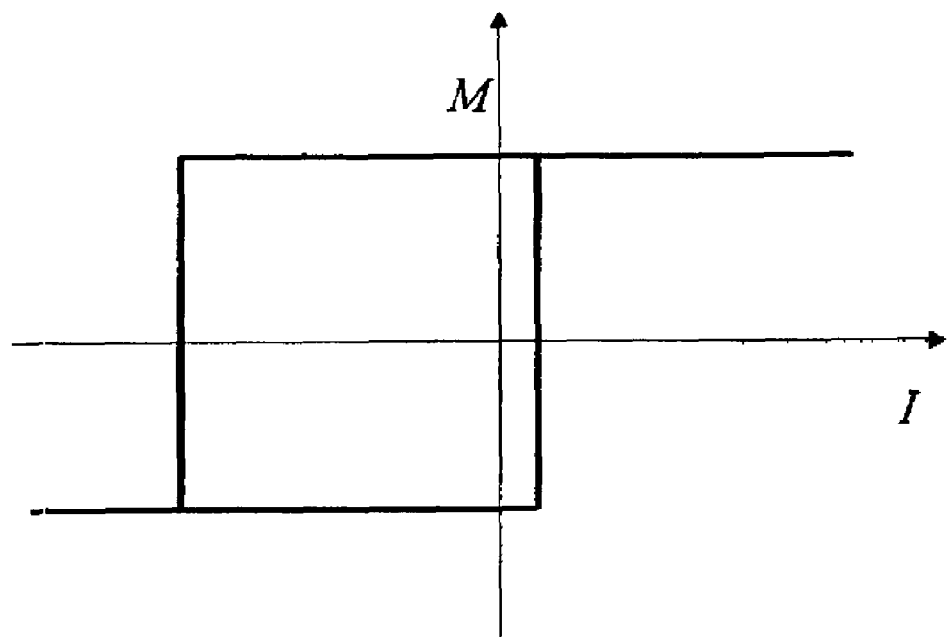
FIG. 5 is a graphical representation which illustrates the current-magnetization curve of the recording layer 12 in the state where the external magnetic field H is impressed.

FIG. 5 is a graphical representation which illustrates the current-magnetization curve of the recording layer 12 in the state where the external magnetic field H is impressed. That is, the horizontal axis of this graph expresses the spin-polarized current supplied to the recording layer 12, and a vertical axis expresses the magnetization M of the recording layer.

As shown in this figure, the threshold value of the spin-polarized current for producing Magnetization M in a recording layer 12 can also be controlled by the external magnetic field 14.

As explained above, in the embodiment of the invention, the direction of the spin polarization in the spin control layer 14 is controlled by the magnetic field from the recording head 16. And the spin of the electrons supplied from the probe 15 is polarized to the direction of the spin polarization when they pass the spin control layer 14. And the spin of the polarized electrons is transferred to the magnetic recording layer 12, and the magnetization M is written according to the direction of the spin of the electrons. This write-in current flows out toward the electrode layer 11 after that.

As mentioned above with reference to FIG. 5, it is also possible to control the write-in threshold value of the spin-polarized current for the recording layer 12 by the external magnetic field from the recording head 16.

In the embodiment, the magnetic field impressed from the recording head 16 does not especially need to be restricted to a minute range. And it is possible to write only in a very minute range of the magnetic recording layer 12 by the local current supplied from the tip of the minute probe 15. That is, as compared with the conventional recording method, the super-high density magnetic recording which dramatically raised the recording density is attained.

On the other hand, a read-out of the information recorded in this way can be performed using a magnetoresistance effect. That is, a resistance between the recording layer 12 and the spin control layer 14 is measured. When the magnetization direction of the recording layer 12 and the magnetization direction of the spin control layer 14 are parallel, resistance is low, and resistance is high when these magnetizations are anti-parallel.

Since the magnetization direction of the spin control layer 14 is controllable by the recording head 16 in the predetermined direction, the magnetization direction of the recording layer 12 can be determined by detecting the resistance change.

Figure 6A:
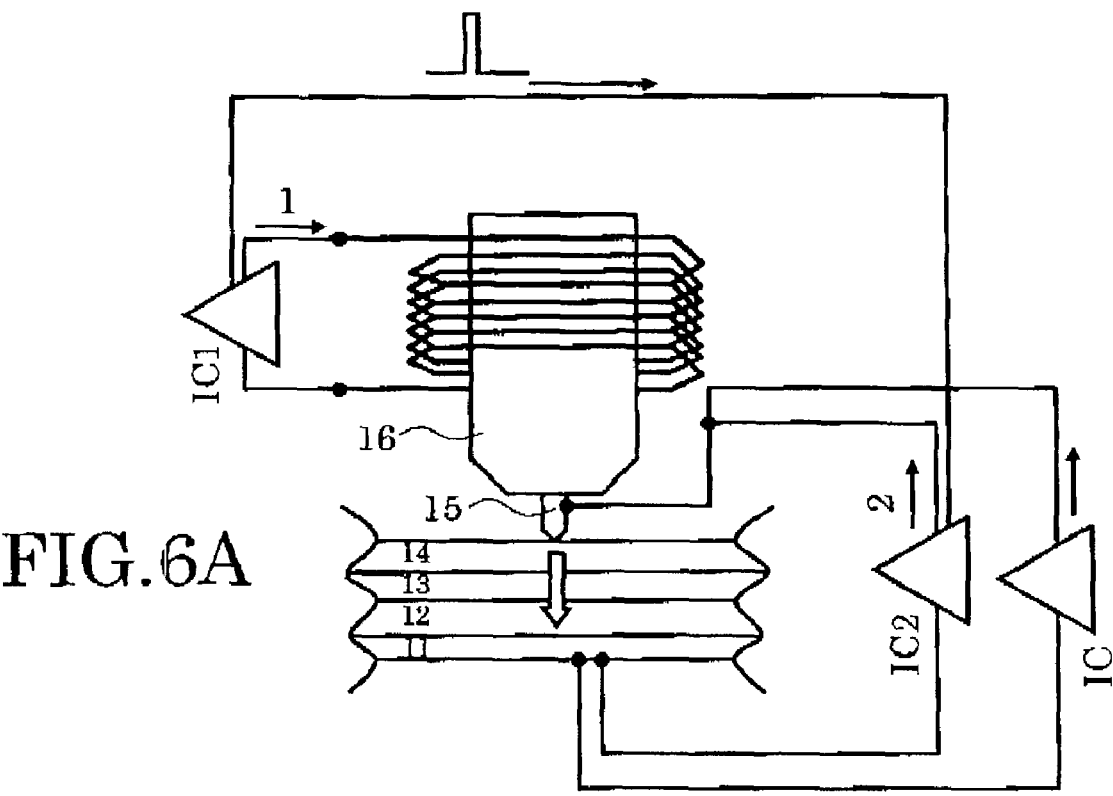
FIGS. 6A and 6B are schematic diagrams in order to explain the system configuration of the magnetic recording apparatus according to the embodiment of the invention.
Figure 6B:
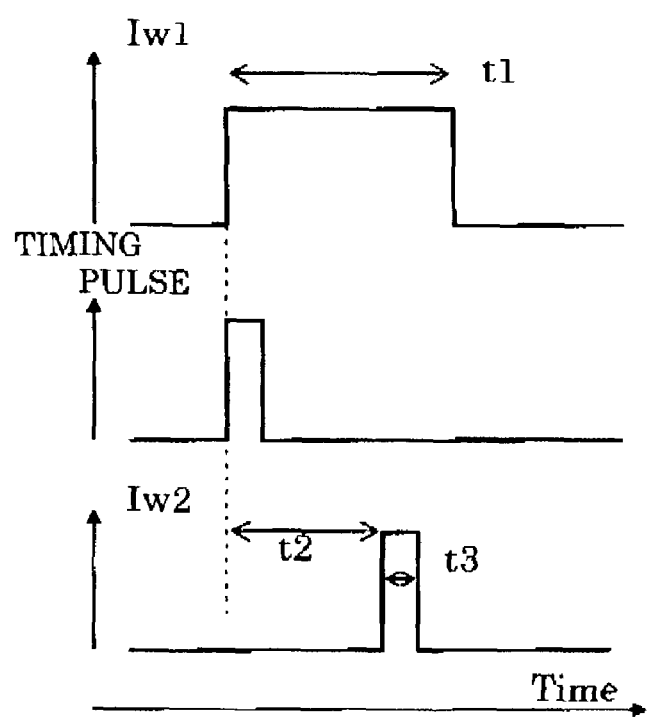

Here, the sense current passed at the time of read-out must be smaller than the recording current passed at the time of write-in. It is because the magnetization of the recording layer will be reversed and information will be lost at the time of read-out if the sense current is larger than the recording current FIGS. 6A and 6B are schematic diagrams in order to explain the system configuration of the magnetic recording apparatus according to the embodiment of the invention. This recording/reproducing system can be driven by the three ICs as shown in FIG. 6A or it may be driven by a composite IC which has an equivalent function. At the time of recording, the record circuit 1 is made to generate drive current (Iw1) by the IC1 for recording. And the recording coil is excited.

A timing pulse is generated simultaneously and the IC2 for record is synchronized. The recording circuit 2 is made to generate drive current Iw2 with a timing of a delay time (t2) on the basis of a timing pulse in IC2 for record as shown in FIG. 6B. If it carries out like this, after making magnetization of the high-polarized spin control layer 14 of the magnetic recording medium magnetize in the predetermined direction, magnetization of the magnetic recording layer 12 is magnetizable in the same direction with drive current Iw2. In this case, it is required that the time of both (t2+t3) and t1 should be shorter than the time required for the head to cross the shortest bit length.

At the time of reproduction, fixed bias current Ib is passed by IC for reproduction to a reproducing circuit.

And the resistance change corresponding to the magnetization recorded on the medium by the magnetoresistance effect in a medium, i.e., voltage change, is read by the IC for reproduction. The relation between Ib and Iw2 needs to fill Ib<Iw2 as mentioned above. The above is a reproduction principle by current drive.

It may be better to maintain at constant voltage in the reproducing circuit containing the magnetic recording medium 10, probe 15, and recording head 16. For example, it may be more advantageous to maintain the voltage at a fixed value in order to keep the reliability of the contact resistance between the probe and the head boundary, etc. In this case, the method of passing bias current (Ib) by constant voltage mode by using the IC for reproduction, and reading current change by the same IC for reproduction is suitable. The relation between Iw2 and Ib may preferably be the same as the above-mentioned one.

Hereafter, each of the magnetic recording medium 10, the probe 15, and the magnetic head 16 which can be used in the embodiment will be explained in full detail.

First, the magnetic recording medium 10 will be explained. The magnetic recording medium 10 may comprise, other than the fundamental constituent elements illustrated in FIGS. 2A, an additional element such as a base layer (not shown) for controlling characteristic (such as crystal structure, crystal orientation characteristic, etc.) of the magnetic recording layer 12, etc., if needed. Moreover, a protection layer (not shown) which consists of carbon, SiO2, etc. may be provided on the magnetic recording layer 12 or the spin control layer 14 if needed.

Moreover, a recording medium 10 may have a structure which has two or more regions divided in a lateral direction.

Figure 7:
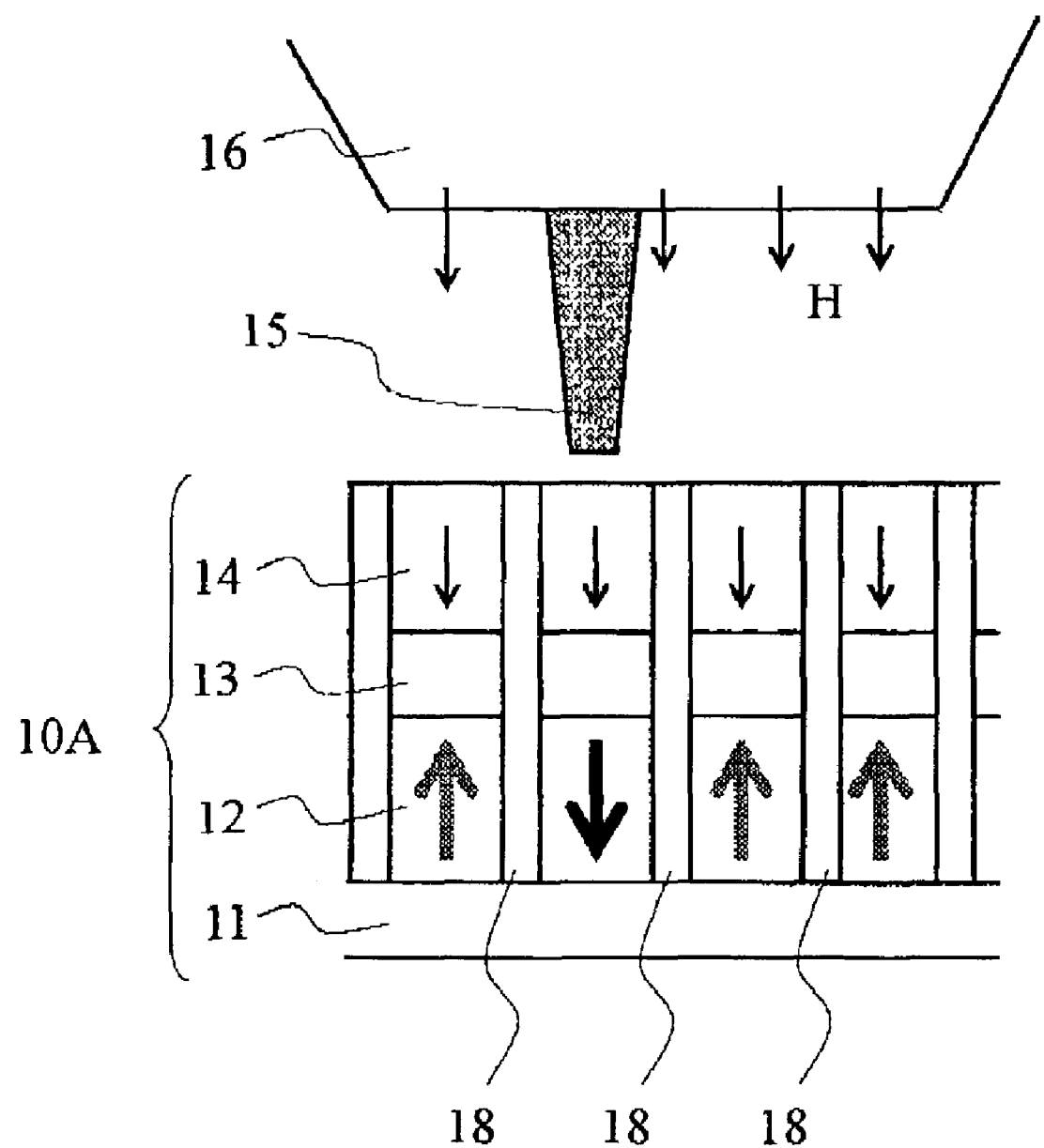
FIG. 7 is a schematic sectional diagram showing the recording medium separated in this way.

FIG. 7 is a schematic sectional diagram showing the recording medium separated in this way. That is, recording medium 10A illustrated in this figure has the following structures. The magnetic recording layer 12, the intermediate layer 13, and the spin control layer 14 prepared on the electrode layer 11 are divided into two or more independent portions by the separation regions 18, respectively. The separation regions 18 may be formed by a material which is non-magnetic or electrically insulative.

Thus, if the medium is divided into two or more portions by the separation regions 18, it becomes possible to specify recording bit size certainly. As a result, the generation of a protrusion of the record area, a cross-talk, cross-erase, etc. can be prevented.

Figure 8:
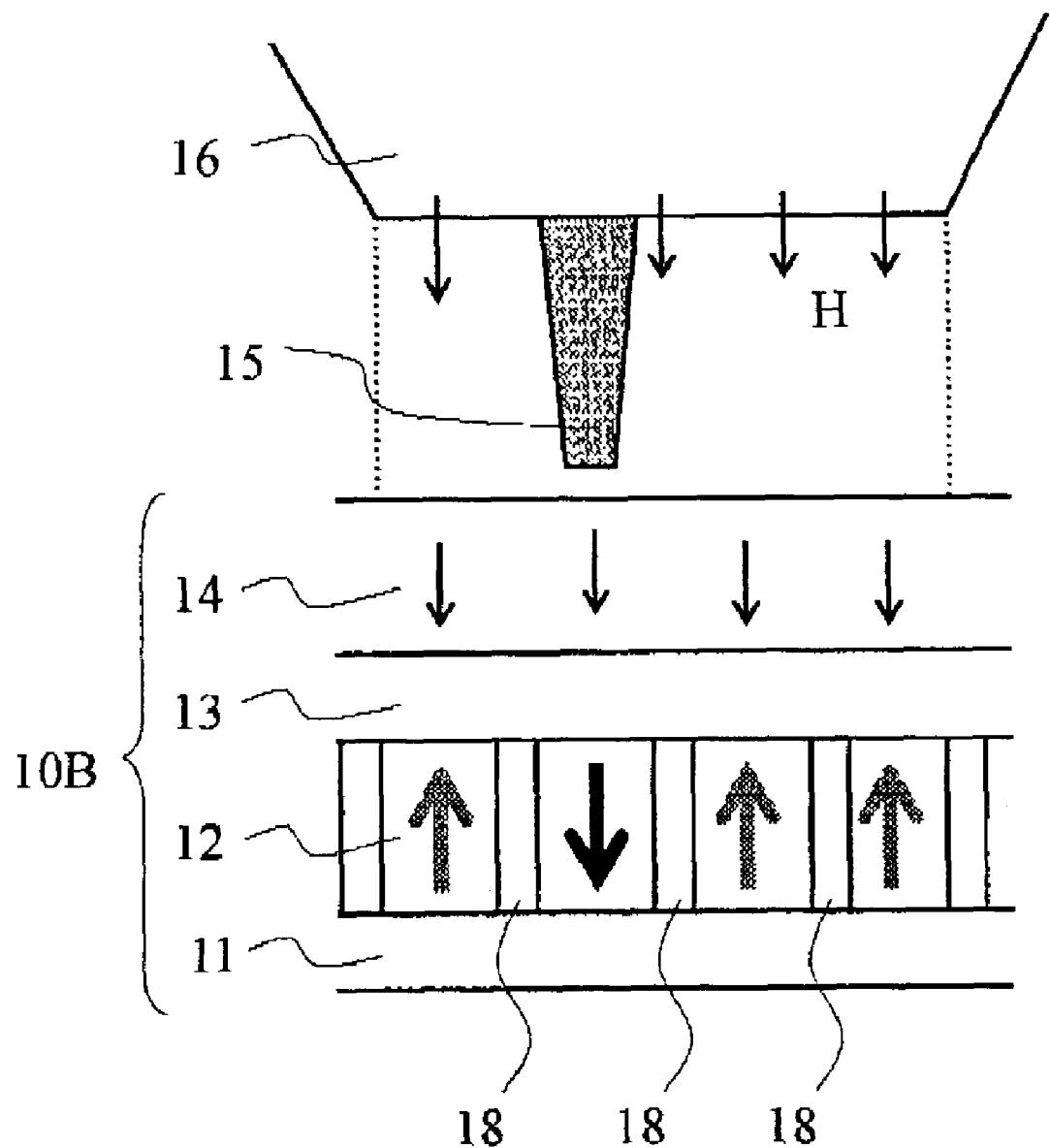
FIG. 8 is a schematic sectional diagram showing the magnetic recording medium 10B where only the magnetic record layer 12 is divided into the plural independent portions by the separation domains 18.

Such separation domains 18 do not necessarily need to divide all of the recording layer 12, the intermediate layer 13, and the spin control layer 14. For example, in magnetic recording medium 10B illustrated in FIG. 8, only the magnetic record layer 12 is divided into the plural independent portions by the separation domains 18. Also in this case, the separation domains 18 can be formed by the material which is non-magnetic or electrically insulative, and the effect that recording bit size can be specified correctly is acquired. Similarly, even if the separation domains 18 are provided only in an intermediate layer 13 or the spin control layer 14, the recording bit size can be specified correctly by the current restricting function of the domains 18.

In every magnetic recording medium explained above, a material which has a large magnetic anisotropy is suitable for the material of a magnetic particle used for the recording layer 12. As for this viewpoint, it is desirable to use an alloy including the magnetic element chosen from the group which consists of cobalt (Co), iron (Fe) and nickel (nickel), and the metal element chosen from the group which consists of platinum (Pt), samarium (Sm), chromium (Cr), manganese (Mn), bismuth (Bi) and aluminum (aluminum), as the magnetic metal material.

In particular, a cobalt (Co)-base alloy with a large crystal magnetic anisotropy, the alloys which base on CoPt, SmCo, and CoCr, and ordered alloys such as FePt and CoPt, are more desirable. Specifically, Co—Cr, Co—Pt, Co—Cr—Ta, Co—Cr—Pt, Co—Cr—Ta—Pt, $Fe_{50}Pt_{50}$, $Fe_{50}Pd_{50}$, $Co_3Pt_1$, etc. are mentioned.

Moreover, as magnetic materials, alloys including rare earth (RE) and transition metal (TM) such as Tb—Fe, Tb—Fe—Co, Tb—Co, Gd—Tb—Fe—Co, Gd—Dy—Fe—Co, Nd—Fe—Co and Nd—Tb—Fe—Co, multilayered films including a magnetic layer and a noble metal layer such as Co/Pt, Co/Pd, etc., half-metal such as PtMnSb, magnetic oxides such as Co ferrite and Ba ferrite, etc. can also be used as the magnetic material.

Furthermore, in order to improve the magnetic properties of the magnetic materials mentioned above, the following elements or compounds may be added:

For example, elements such as copper (Cu), chromium (Cr), niobium (Nb), vanadium (V), tantalum (Ta), titanium (Ti), tungsten (W), a hafnium (Hf), indium (In), silicone (Si), and boron (B),etc. can be added. Compounds of the any one of the above-mentioned elements and at least one of elements chosen from oxygen (O), nitrogen (N), carbon (C) and hydrogen (H) may also be added.

With regard to the magnetic anisotropy, the horizontal magnetic anisotropy used in the conventional HDD, the vertical magnetic anisotropy used in a magneto-optical recording, or the magnetic anisotropy of a mixture of the horizontal and vertical anisotropy can be employed. With regard to the magnetic anisotropy constant, in order to exceed the thermal-agitation limit, the recording layer which has a large magnetic anisotropy constant is used. Furthermore, it is necessary to have Hc with which the magnetization is not influenced by the magnetic field from a magnetic head.

The magnetic recording layer 12 may have a structure which has two or more magnetic particles and the nonmagnetic material which fills between these magnetic particles, and the structure where the magnetic particles are distributed in the nonmagnetic material.

The method of dividing the magnetic particles with the nonmagnetic material is not limited in a specific way. For example, a non-magnetic element may be added to a magnetic material and formed as a film, and thereby nonmagnetic materials, such as chromium (Cr), tantalum (Ta), boron (B), oxides ($SiO_2$ etc.), and a nitrides may be precipitated between the grains of the magnetic particles.

Alternatively, minute holes may be formed in a nonmagnetic material layer by using a lithography technology, and magnetic particles may be embedded in the holes. Alternatively, di-block-copolymer such as PS-PMMA may be self-organized to form a structure where one polymer is remove to form minute holes and another polymer remains as a mask, then magnetic particles are embedded in the minute holes. Alternatively, particle beam irradiation may be employed to pattern the structure.

Although the thickness of the recording layer 12 is not especially restricted, a thick film of 100 nm or more is not desirable if it takes into consideration to attain high-density recording and to pass the current therethrough. However, since it will become difficult to form the film in many cases if the thickness of the recording layer 12 is set 0.1 nm or less, it is necessary to determine the thickness suitably according to the film forming technology to be used.

A magnetic material or a nonmagnetic material is sufficient as the material of the base layer (not shown) prepared if needed. Although the thickness of the base layer is not especially limited, it is not desirable to make the thickness larger than 500 nm, since manufacturing cost increases.

A non-magnetic base layer may be prepared in order to control the crystal structures of the magnetic body or non-magnetic material of the recording layer 12, or to prevent mixing the impurities from a substrate. For example, if the base layer has the lattice spacing close to the lattice spacing of the magnetic body having a required crystal orientation, the crystal orientation of the magnetic body can be controlled by the base layer. Further, the crystallinity or an amorphous nature of the magnetic body or the nonmagnetic material of the recording layer 12 may also be controllable by using an amorphous base layer which has suitable surface energy.

A second base layer which has another function may be provided under the base layer. In this case, since two base layers can share functions, control of a desired effect may become easier. For example, when it is the purpose to make the crystal grains of the recording layer small, a seed layer having a smaller particle diameter may be prepared on a substrate first, and a base layer which controls the crystallinity of the recording layer may be laminated on the seed layer. In order to prevent mixing of the impurities from a substrate, lattice spacing of the base layer may preferably smaller, or it is desirable to use a dense thin film as the base layer.

The high-polarized spin control layer 14 has the role to change the current supplied from the probe 15 into the spin-polarized current of the direction of magnetization M which should be recorded on the recording layer 12. The direction of the spin polarization of the spin control layer 14, i.e. the direction of the magnetization M, is controlled by the magnetic field from the magnetic head 16. Therefore, with regard to the spin control layer 14, it is desirable to consist of soft magnetic material which can response to a magnetic field quickly from the magnetic head 16. Moreover, in order to perform spin polarization certainly, the high-polarized spin control layer 14 may preferably be formed of material having a high degree of spin polarization.

Here, the degree P of spin polarization is the difference of the density of states of up spin electrons and down spin electrons at the Fermi energy, and is expressed by the following formula;

$$P=(D(\downarrow)-D(\uparrow))/(D(\downarrow)+D(\uparrow))$$

Here, $D(\uparrow)$ and $D(\downarrow)$ express the density of state of the up spin electrons and the down spin electrons, respectively.

Figure 9:
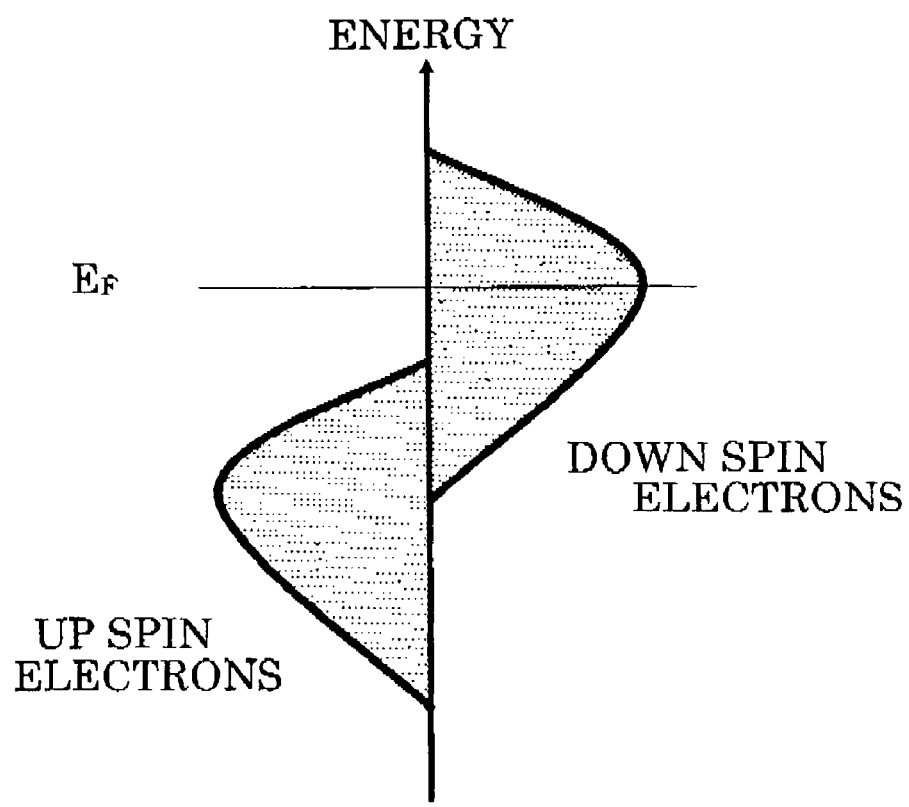
FIG. 9 is a graphical representation where only a down spin electrons have density of states near the Fermi energy.

The material called a "half metal" is known as the material having the biggest degree P of spin polarization, and the degree of spin polarization is 1.0. That is, as shown in FIG. 9, only a down spin electrons have density of states near the Fermi energy Ef.

The materials shown below are known as a material which shows half metal nature, and such material can be used for the high-polarized spin control layer 14. These materials are perovskite type ferromagnetic oxides, rutile type ferromagnetic oxides, spinel type ferromagnetic oxides, and pyrochlore type ferromagnetic oxides including at least any one of cobalt (Co), iron (Fe), and nickel (nickel). Magnetic semiconductor thin films containing the material chosen from at least any one of titanium (Ti), vanadium (V), chromium (Cr), manganese (Mn), iron (Fe), cobalt (Co) and nickel (nickel) etc. are also mentioned.

In addition, since the elemental substance of iron (Fe), cobalt (Co) or nickel (nickel) and the alloy containing at least one of iron (Fe), cobalt (Co) and nickel (nickel) also shows the limited degree of spin polarization P, they can be used for the high-polarized spin control layer 14.

Although the thickness of the high-polarized spin control layer 14 is not especially restricted, a thick film 100 nm or more is not desirable, if it takes into consideration attaining high-density recording and passing the current therethrough perpendicularly. However, since it is not easy to form a film if the thickness of the recording layer is set 0.1 nm or less, it is necessary to take film forming technology into consideration and to determine suitably.

Moreover, with regard to the high-polarized spin control layer 14, a structure where the magnetic particles are distributed in a insulator body may be used. If such a structure is employed, it becomes possible to prevent the current to spread in a lateral direction.

An intermediate layer 13 is provided in order to prevent an exchange coupling of the magnetization of the high-polarized spin control layer 14 and the magnetization of the recording layer 12. The exchange coupling between two magnetic bodies decreases if distance therebetween becomes larger. Considering this viewpoint, the thicker one of an intermediate layer 13 is desirable. However, since the polarization direction of the spin-polarized current must be saved in order to record on the recording layer 12 by the spin-polarized current, the thickness of the layer 13 must be smaller than the mean free path in the material.

For example, the case where an intermediate layer 13 is constituted from copper (Cu) will be described below. In the case of copper (Cu), the mean free path is about 10 nm. Exchange coupling can be neglected if the thickness of the intermediate layer 13 is 3 nm or more. Therefore, it is desirable to set the thickness of the intermediate layer 13 using copper (Cu) within the range from 3 nm to 10 nm.

As a means to pass current to the recording medium, electrons may be irradiated by cold emission from the probe 15 which consists of a conductor or a semiconductor, for example. Alternatively, the probe 15 and the magnetic recording medium 10 may be contacted and the current may be directly passed. As a probe used in these cases, a needlelike substance made of metal or semiconductor, or a substance which has a projection at its tip may be used. Alternatively, fine structure, such as "carbon nano-tube" can also be used.

Or the electrode which is not illustrated may be provided in the upper part of the magnetic recording medium 10, and current may be passed from the electrode to the magnetic recording medium 10. That is, any means which enables to pass the current to the magnetic recording medium 10 can be employed in the invention.

As a means to impress a magnetic field to the magnetic recording medium 10, what has the magnetic circuit which contains an induction coil and a magnetic pole in the edge of a floating slider which is used in the conventional HDD can be used. Or a permanent magnet may be used in order to impress the magnetic field.

Alternatively, a magnetic layer is added to the medium, and a momentary and local magnetic field may be generated by producing a magnetization distribution. Such a magnetization distribution may be caused by a temperature distribution or an optical irradiation. Or the stray magnetic field generated from the magnetic layer itself which records information may be used.

In installing a permanent magnet, it becomes possible to perform high-speed and high-density magnetic field impression by making the distance from the medium 10 variable, or by making the magnet minute.

Figure 10:
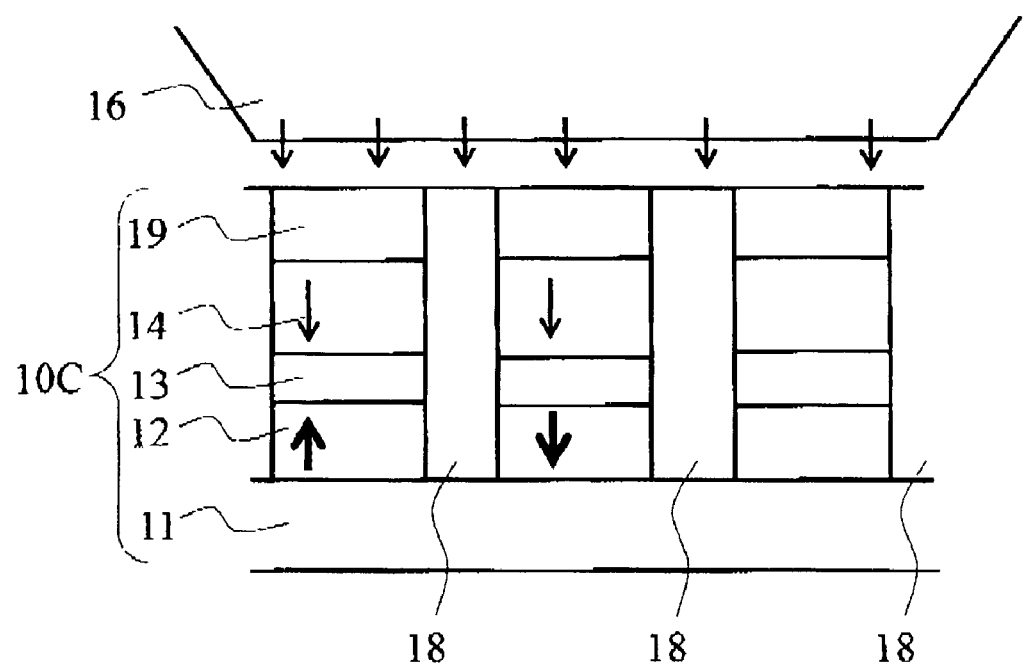
FIG. 10 is a schematic sectional diagram which expresses the example which has the electrode layer 19 in the upper part of a recording medium 10 instead of a probe 15.

FIG. 10 is a schematic sectional diagram which expresses the example which has the electrode layer 19 in the upper part of a recording medium 10 instead of a probe 15. That is, magnetic recording-medium 10C illustrated in this figure has the structure explained below. On the lower electrode layer 11, a recording layer 12, an intermediate layer 13, and the high-polarized spin control layer 14 are laminated, and it has further the structure where the upper electrode layer 19 was provided on it. And this laminated structure is divided into two or more regions by the separation regions 18. Each of these divided regions acts as a recording bit.

When using this recording medium 10C, current is passed from the upper electrode 19 to the lower electrode 11 perpendicularly to the film plane. Therefore, if current can be arbitrarily given to each of the divided upper electrode 19, the probe 15 illustrated in FIGS. 2A through 3C becomes unnecessary.

Hereafter, the embodiments of the invention will be explained in more detail referring to some examples.

FIRST EXAMPLE

Figure 11:
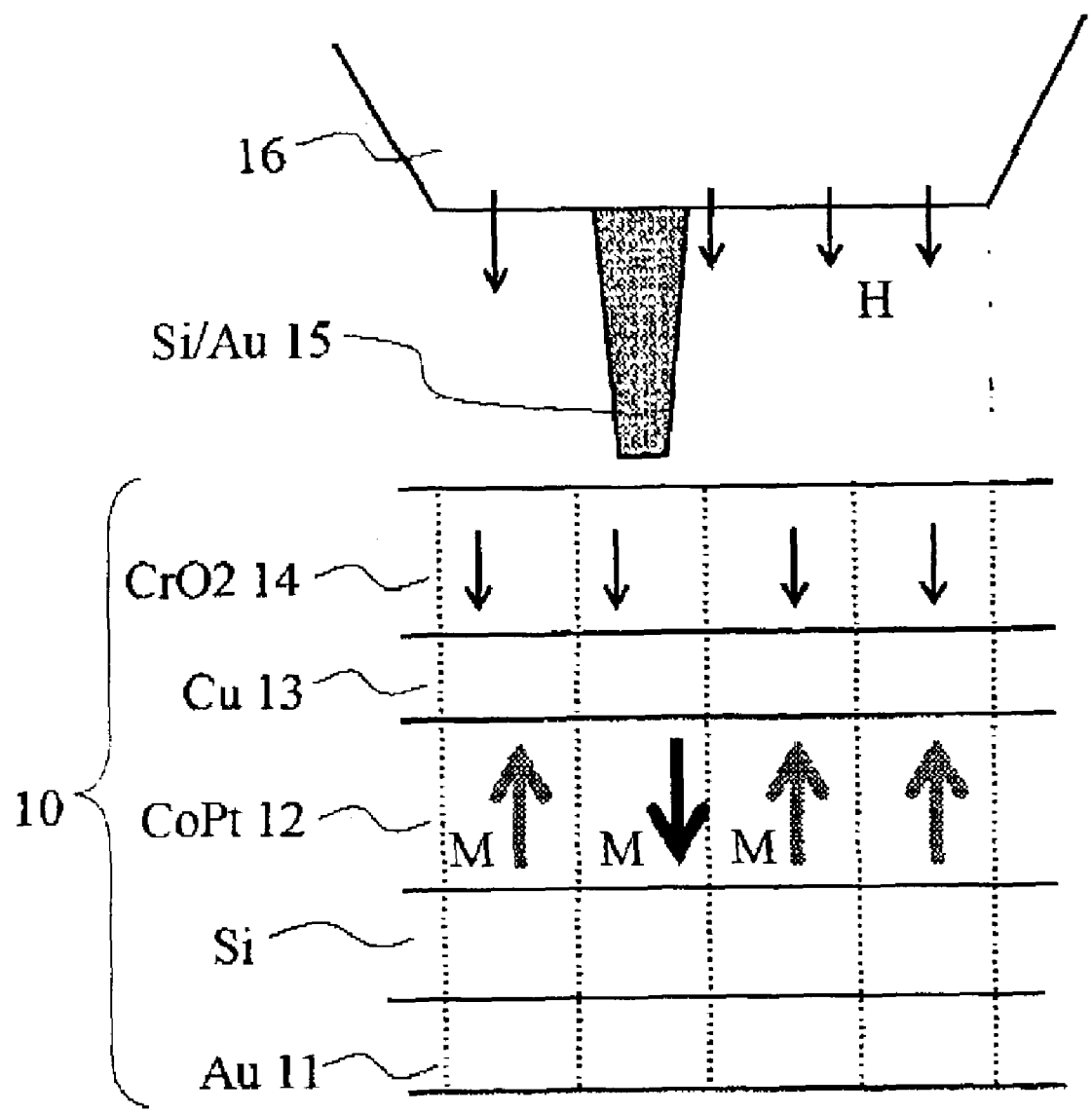
FIG. 11 is a conceptual diagram showing the sectional structure used in this example.

FIG. 11 is a conceptual diagram showing the sectional structure used in this example.

That is, in the high-polarized spin control layer 14 of a recording medium, the chromium oxide ($CrO_2$) which has rutile type structure was used. Moreover, cobalt platinum (CoPt) was used in the recording layer 12. Copper (Cu) was used in the intermediate layer 13. Gold (Au) was used in the electrode layer 11.

First, the gold (Au) electrode layer 11 was formed in the back side of the silicon (Si) substrate S. Next, the cobalt platinum (CoPt) layer 12 was formed on silicon substrate S, and copper (Cu) was grown on it. Furthermore, chromic oxide ($CrO_2$) was formed on it. The thickness of cobalt platinum (CoPt) was made about 20 nm, the thickness of copper (Cu) was made about 5 nm and the thickness of chromic oxide ($CrO_2$) was made about 10 nm.

Next, the probe 15 was formed by coating the surface of a silicon (Si) short needle with gold (Au) The probe 15 had a cone-like shape and the diameter at a tip was about 10 nm. The magnetic head 16 was formed so that the magnetic field of 2 kOe could be impressed.

Figure 12:
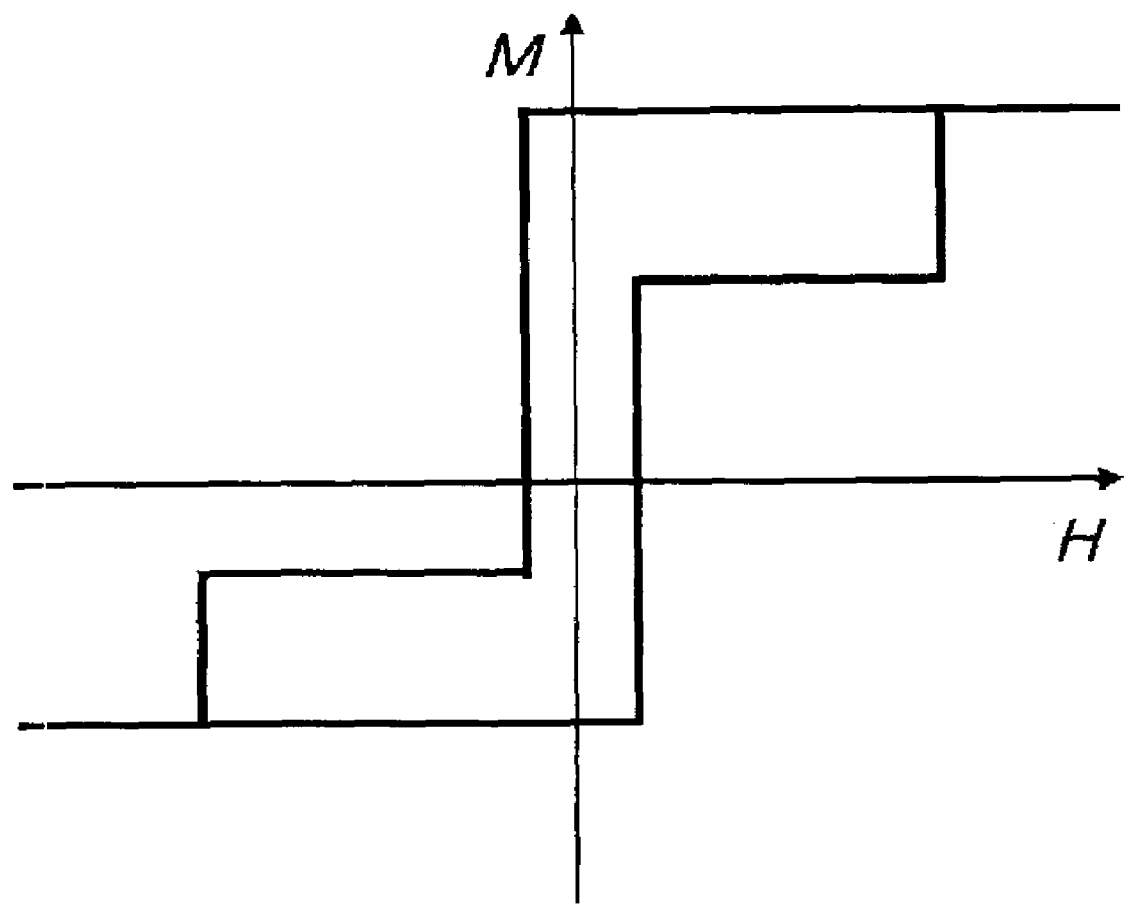
FIG. 12 is a graphical representation which expresses the result of having performed magnetization measurement by VSM, to the recording medium formed in this example.

FIG. 12 is a graphical representation which expresses the result of having performed magnetization measurement by VSM, to the recording medium formed in this example. The horizontal axis of this graph expresses a magnetic field H, and a vertical axis expresses Magnetization M, respectively. In addition, MH characteristic was measured apart from this. Consequently, Hc of the single layer of the same chromic oxide ($CrO_2$) as what was used for this example was 500 Oe, and Hc of the single layer of cobalt platinum (CoPt) was 2500 Oe.

As shown in FIG. 12, the magnetic recording medium of this example clearly shows the two steps of loops, and changes of Magnetization M are seen at about 500 Oe and at about 2500 Oe. That is, since the layers of chromic oxide ($CrO_2$) and cobalt platinum (CoPt) were not magnetically exchange coupled, it turned out that the characteristic curve where each Hc does not affect each other was obtained.

That is, when the copper (Cu) layer which is 5 nm thick was inserted as the intermediate layer 13, it was confirmed that the exchange coupling between the spin control layer 14 which consists of chromic oxide ($CrO_2$), and the recording layer 12 which consists of cobalt platinum (CoPt) was not acting. Furthermore, since the direction of a magnetic field 1 was perpendicularly (vertical to the film plane) to the medium surface, it was confirmed simultaneously that the direction of an easy axis of the cobalt platinum (CoPt) layer 12 has become perpendicularly to the medium surface.

Next, the Inventors have performed an experiment to record by the spin-polarized current.

First, magnetizations of the chromic oxide ($CrO_2$) layer 14 and the cobalt platinum (CoPt) layer 12 were arranged in the upward direction. To this recording medium, a downward magnetic field was impressed and only the magnetization of the chromic oxide ($CrO_2$) layer 14 was reversed. Electron irradiation was performed from the probe 15 in this state, and resistance of a recording medium was measured simultaneously.

Before performing electron irradiation, since magnetizations of the chromic oxide ($CrO_2$) layer 14 and a cobalt platinum (CoPt) layer were arranged in anti-parallel, it was in the state of high resistance. The voltage of 10 V was applied to the probe 15 and the emission current of 1 mA was confirmed, then the resistance of the recording medium decreased by about 60 m Ω.

That is, since magnetization of the cobalt platinum (CoPt) recording layer 12 was reversed by the electron emission from the probe 15 and the magnetization of the recording layer 12 became parallel with the magnetization of the chromic oxide ($CrO_2$) spin control layer 14, the resistance decreased. That is, it was confirmed that recording to the recording layer 12 was performed by the electron irradiation from the probe 15.

SECOND EXAMPLE

Figure 13:
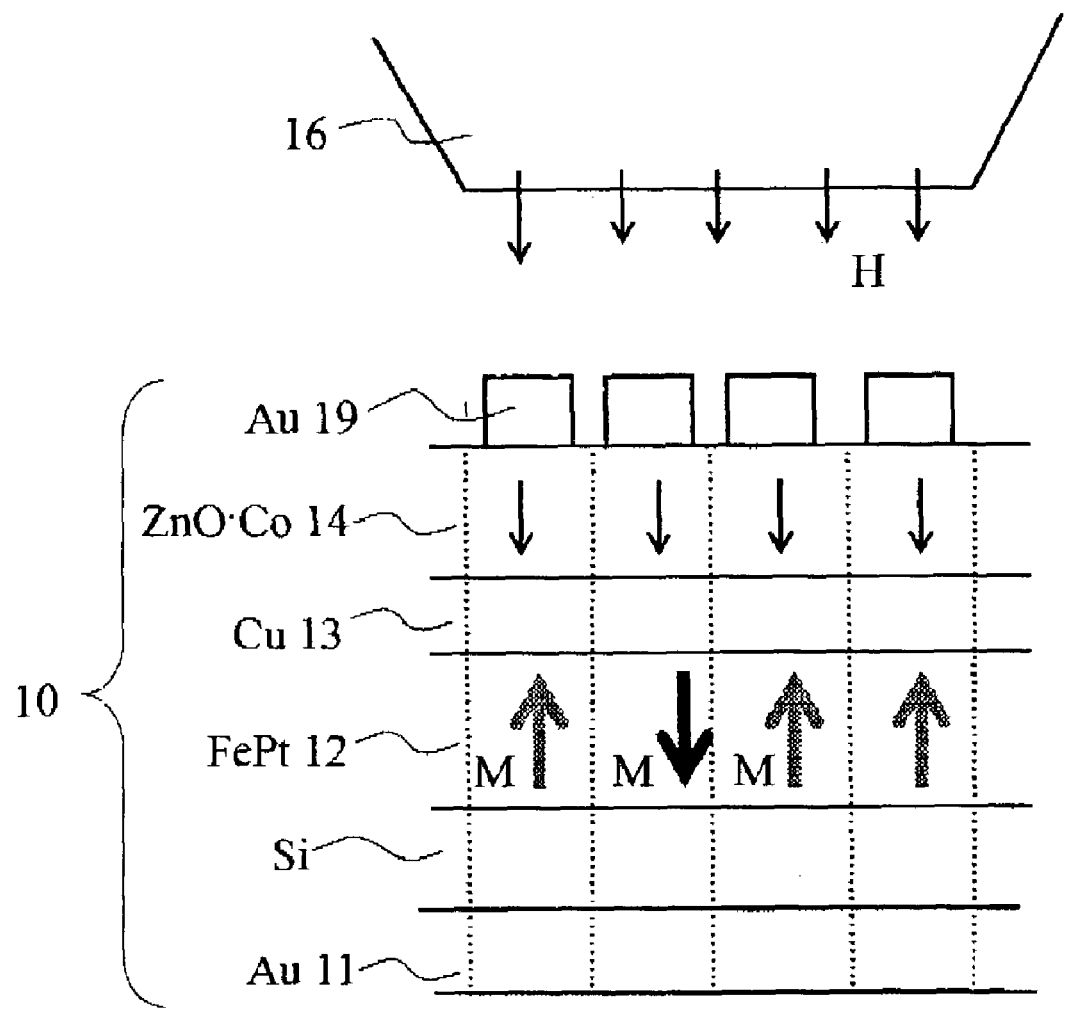
FIG. 13 is a schematic diagram showing the sectional structure used in this example.

FIG. 13 is a schematic diagram showing the sectional structure used in this example.

That is, first, the gold (Au) electrode layer 11 was formed on the back side of the silicon (Si) substrate S so that it became ohmic contact. And 5 nm (FePt) of iron platinum was formed as a recording layer 12 on the silicon substrate S, 5 nm (Cu) of copper was laminated as an intermediate layer 13 on it, and 20 nm (ZnO:Co) of zinc oxides which included cobalt was laminated on it as a high-polarized spin control layer 14. Furthermore, the gold (Au) electrode 19 was formed on it by using a mask (not shown) in order to pass a current to a direction perpendicular to the film plane.

By VSM measurement, it was confirmed that the iron platinum (FePt) single film had Hc of about 9 kOe(s), and that the magnetization easy axis thereof was perpendicular to the film plane. Moreover, it was confirmed that the cobalt added zinc oxide (ZnO:Co) has soft magnetic characteristics.

When the magnetic characteristic of the recording medium of the three-layer structure (FePt/Cu/ZnO:Co) of this example was measured using VSM, a similar two-step loop as shown in FIG. 10 was obtained. That is, it was confirmed that the recording layer 12 and the high-polarized spin control layer 14 were not magnetically exchange coupled.

A magnetic field was impressed to this recording medium from the exterior like the first example mentioned above. Before the start of a recording experiment, each magnetization of the recording layer 12 and the high-polarized spin control layer 14 was changed into the upward state.

Next, the downward external magnetic field was impressed and magnetization of the high-polarized spin control layer 14 was reversed downward. Since the magnetization of the recording layer 12 and magnetization of the high-polarized spin control layer 14 were in anti-parallel at this time, it is in the state of high resistance.

Next, current was passed from the electrode 19 in a perpendicular direction to this recording medium. When the current value was enlarged, the large jump of resistance was seen near at 20 mA, and resistance decreased. That is, magnetization of a recording layer 12 and magnetization of the high-polarized spin control layer 14 changed into the parallel state, and resistance decreased by giant magnetoresistance effect.

Thus, it was confirmed that the magnetization of the recording layer 12 was reversible with the current.

THIRD EXAMPLE

Figure 14:
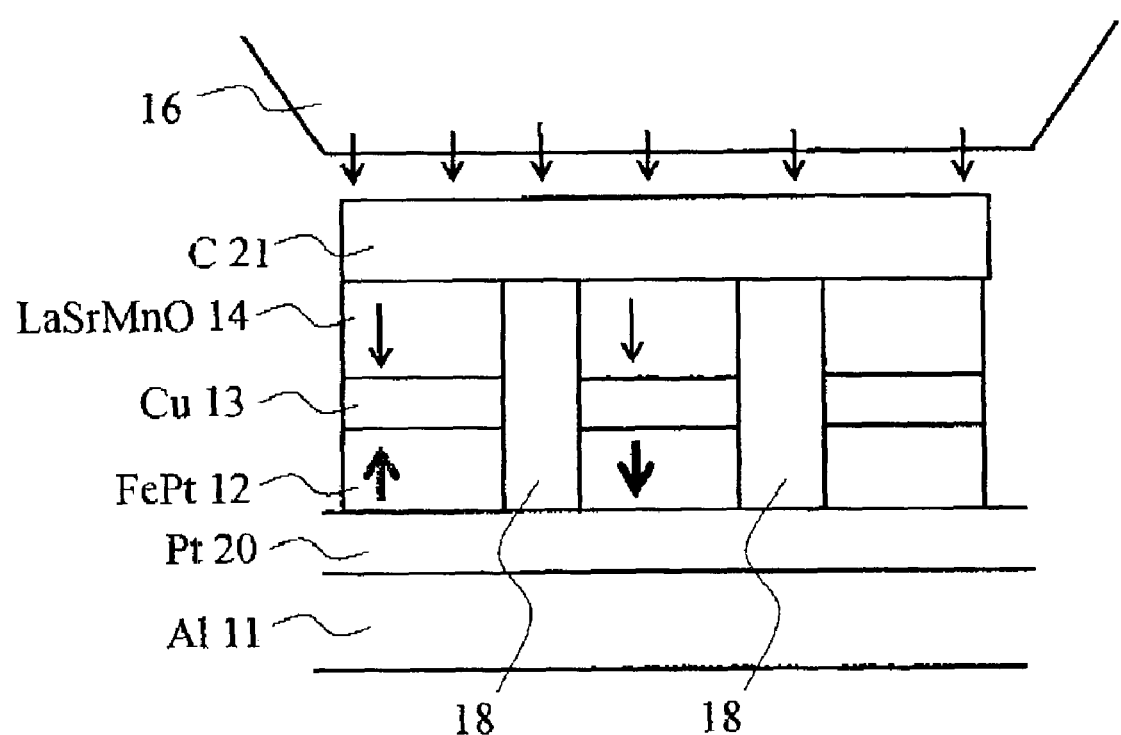
FIG. 14 is a schematic diagram showing the sectional structure used in this example.

FIG. 14 is a schematic diagram showing the sectional structure used in this example.

That is, the platinum (Pt) base layer 20 with a thickness of about 50 mn, the iron platinum (FePt) recording layer 12 with a thickness of about 5 nm, the copper (Cu) intermediate layer 13 with a thickness of about 5 nm, and the lanthanum oxide strontium manganese ($La_{0.7}Sr_{0.3}MnO_3$) high-polarized spin control layer 14 with a thickness of about 20 nm were laminated by the sputtering method in this order on the aluminum substrate 11. At the time of sputtering film formation, the substrate 11 was heated at 300 degrees C.

It was confirmed in advance that the $La_{0.7}Sr_{0.3}MnO_3$ high-polarized spin control layer 14 showed a half metallic characteristic.

Next, the cylindrical clusters with a diameter of about 50 nm were formed by lithography, etching, and lift-off technique. The space between the clusters was filled with the insulator 18. Then, the laminating of the carbon (C) protection layer 21 with a thickness of about 1 nm was carried out. It was checked beforehand by a measurement using VSM that the iron platinum (FePt) recording layer 12 had the coercive force of about 3.5 kOe, and perpendicular magnetic anisotropy was formed.

Next, the usual magnetic recording head 16 was provided, and silicon (Si) was prepared to adjoin the head 16. The coat of the surface was carried out with the gold (Au) in order to form the probe head 15 The probe head 15 had corn-like form and the diameter at the tip was about 50 nm. Distance of the tip of a probe 15 and a recording medium was set to about 100 nm. At the distance, the emission current of 10 mA was obtained with the impressed voltage of 10V.

The magnetic field of about 3 kOe can be impressed from the magnetic recording head 16. That is, since the coercive force (3.5 kOe) of the iron platinum (FePt) recording layer 12 was over the magnetic field (3 kOe) from a magnetic head 16, it was difficult to carry out magnetic recording only by the magnetic field from a recording head 16.

In this example, the following procedures were performed for recording to the magnetic recording medium, and reproduction from the medium.

First, the magnetic recording by the conventional method was tried without irradiating an electron ray from the probe 15 with the magnetic recording medium of this example. That is, although the magnetic field was impressed from the recording head 16, it was checked that the magnetization of the recording layer 12 did not reverse. This is a natural result, considering the coercive force of the recording layer 12 and the recording capability of the recording head 16.

Next, recording was performed by irradiating an electron ray to the magnetic recording medium of this example. At this time, a magnetic field was not impressed from the magnetic head 16. As an initial state, each magnetization of the recording layer 12 and the high-polarized spin control layer 14 was turned upward. And the impressed voltage to the probe 15 was changed to 10V, and the relation between impressed voltage and the resistance of a medium was investigated. However, change of resistance was not seen up to impressed voltage 10V. That is, recording only by electron irradiation was not performed.

Next, recording with the irradiation of an electron ray was tried, while impressing a magnetic field from the head 16. Impressed magnetic field was about 3 kOe, and gave the downward magnetic field. And the impressed voltage of an electron ray was changed to about 10V. As a result, a sharp reduction of the resistance of a recording medium was seen at about 7V. That is, since magnetization of a recording layer 12 was reversed, it became downward and parallel to the magnetization of the high-polarized spin control layer 14 and, thus the resistance decreased.

Furthermore, after returning the impressed voltage to the probe 15 to zero, direction of the impression magnetic field from a magnetic head 16 was reversed, and the resistance was measured. As a result, the resistance of a medium increased. That is, only magnetization of the high-polarized spin control layer 14 was reversed upward with the impression magnetic field from the head 16, and since the magnetizations of the recording layer 12 and the control layer 14 became in a state of anti-parallel, resistance of the medium increased.

Thus, it was confirmed that magnetization of only the recording layer 12 had been reversed in the record process mentioned above.

As explained above, it was found possible to record by the spin-polarized current by electron irradiation to the recording layer 12 which has a large magnetic anisotropy energy (coercive force) unrecordable by a conventional method.

FOURTH EXAMPLE

Next, the example of the magnetic record apparatus of this invention is explained as the fourth example of the invention. The magnetic recording methods as explained with reference to FIGS. 1 through 14 can be realized as a magnetic recording/reproducing apparatus.

Figure 15:
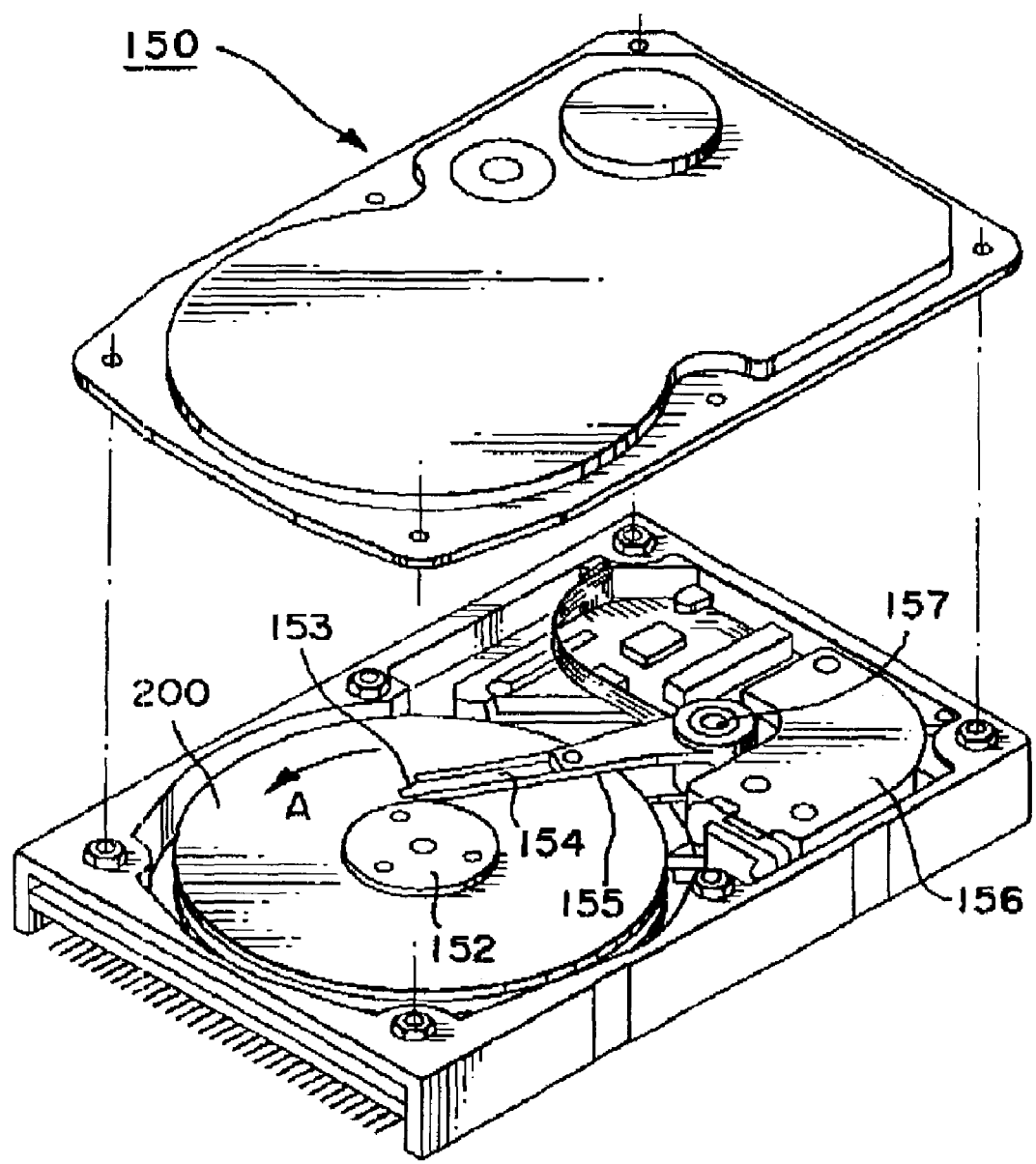
FIG. 15 is a perspective view that schematically shows a configuration of a major part of a magnetic recording/reproducing apparatus according to the embodiment of the invention.

FIG. 15 is a perspective view that schematically shows a configuration of a major part of a magnetic recording/reproducing apparatus according to the embodiment of the invention. The magnetic recording/reproducing apparatus 150 according to the invention is an apparatus of a type using a rotary actuator. In FIG. 15, a recording magnetic disk 200 is mounted on a spindle 152 and rotated in the arrow A direction by a motor, not shown, which is responsive to a control signal from a drive device controller, not shown. The magnetic recording apparatus according to the embodiment of the invention may also include a plurality of recording magnetic disks 200.

The disk 200 includes the recoding layer 12 and the spin control layer 14 as explained with reference to FIGS. 1 through 14, and the magnetization of the recording layer 12 can be reversed by passing a spin-polarized current through the recording layer 12. Further, as shown in FIGS. 7, 8, 11 and 14, the disk 200 may have the patterned structure where the recording bits are separated by the separation region 18.

A head slider 153 executed recording or reproduction of information to be stored in the magnetic disk 200 is attached to the tip of a thin-film suspension 154. The head slider 153 includes the magnetic head according to the foregoing embodiment near its up.

When the magnetic disk 200 rotates, the medium-facing surface (ABS) of the head slider 153 is held with a predetermined floating amount from the surface of the magnetic disk 200. Alternatively, the apparatus may employ a contact-type configuration where the slider 153 is in contact with the disk 200 during the operation.

The suspension 154 is connected to one end of an actuator arm 155 that has a bobbin portion for holding a drive coil, not shown. At the other end of the actuator arm 155, a voice coil motor 156, which is a kind of linear motor, is provided. The voice coil motor 156 is composed of a drive coil, not shown, wound up on the bobbin portion of the actuator arm 155, and a magnetic circuit made up of a permanent magnet and an opposed yoke disposed in confrontation so as to sandwich the drive coil.

The actuator arm 155 is held by ball bearings, not shown, which are provided upper and lower two positions of a rigid shaft 157 for free rotational and slidable movements with a driving force from the voice coil motor 156.

Figure 16:
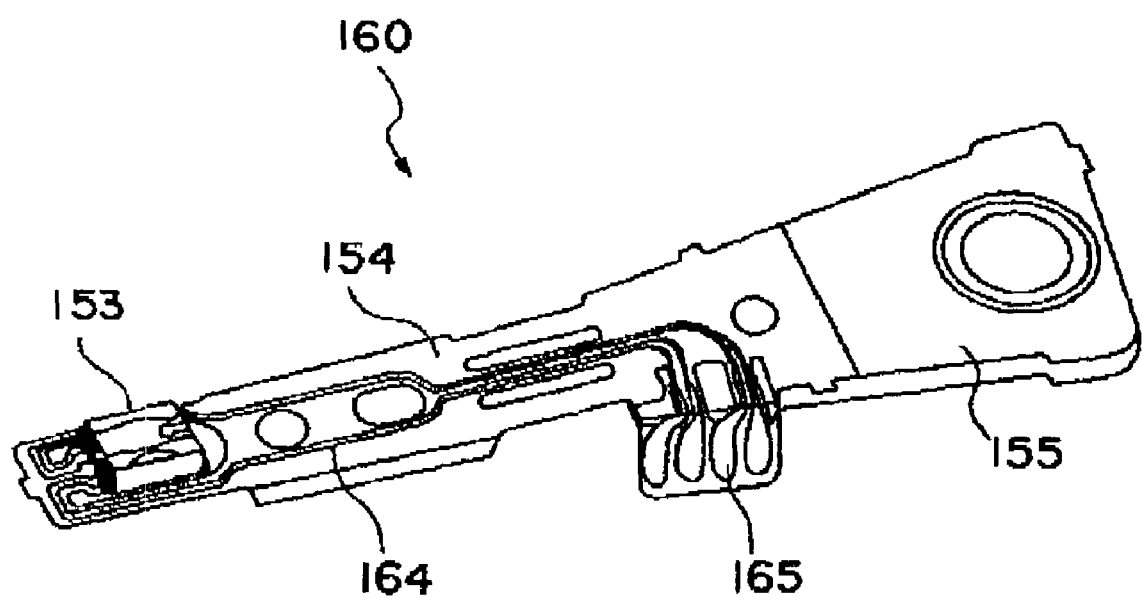
FIG. 16 is an enlarged, perspective view of the magnetic head assembly from the actuator arm 155 to its distal end, taken from the disk side.

FIG. 16 is an enlarged, perspective view of the magnetic head assembly from the actuator arm 155 to its distal end, taken from the disk side. The magnetic head assembly 160 includes the actuator arm 155 having the bobbin portion for holding the drive coil, for example, and the suspension 154 is connected to one end of the actuator arm 155.

At the extremity of the suspension 154, the head slider 153 incorporating the probe 15 and the magnetic head 16 as explained with reference to FIGS. 1 through 14 according to the invention is attached. The suspension 154 has a lead line 164 for writing and reading signals, and the lead line 164 and electrodes of the magnetic head incorporated in the head slider 153 are electrically connected. Numeral 165 denotes an electrode pad of the magnetic head assembly 160.

The magnetic recording/reproducing apparatus according to the example of the invention, as shown in FIGS. 15 and 16, can greatly improve the recording density as compared with conventional systems, and can simultaneously improve the stability and reliability of reproduced signals by performing a recording with the probe 15 and the magnetic head 16.

The reproduction can be performed by measuring the resistance of the disk 200 with the probe 15, or by detecting the magnetization of the recording layer 12 with a magnetic detector such as a GMR element which may be incorporated in the slider 153.

FIFTH EXAMPLE

Next, another example of the magnetic recording apparatus of the invention is explained as the fifth example of the invention.

Figure 17:
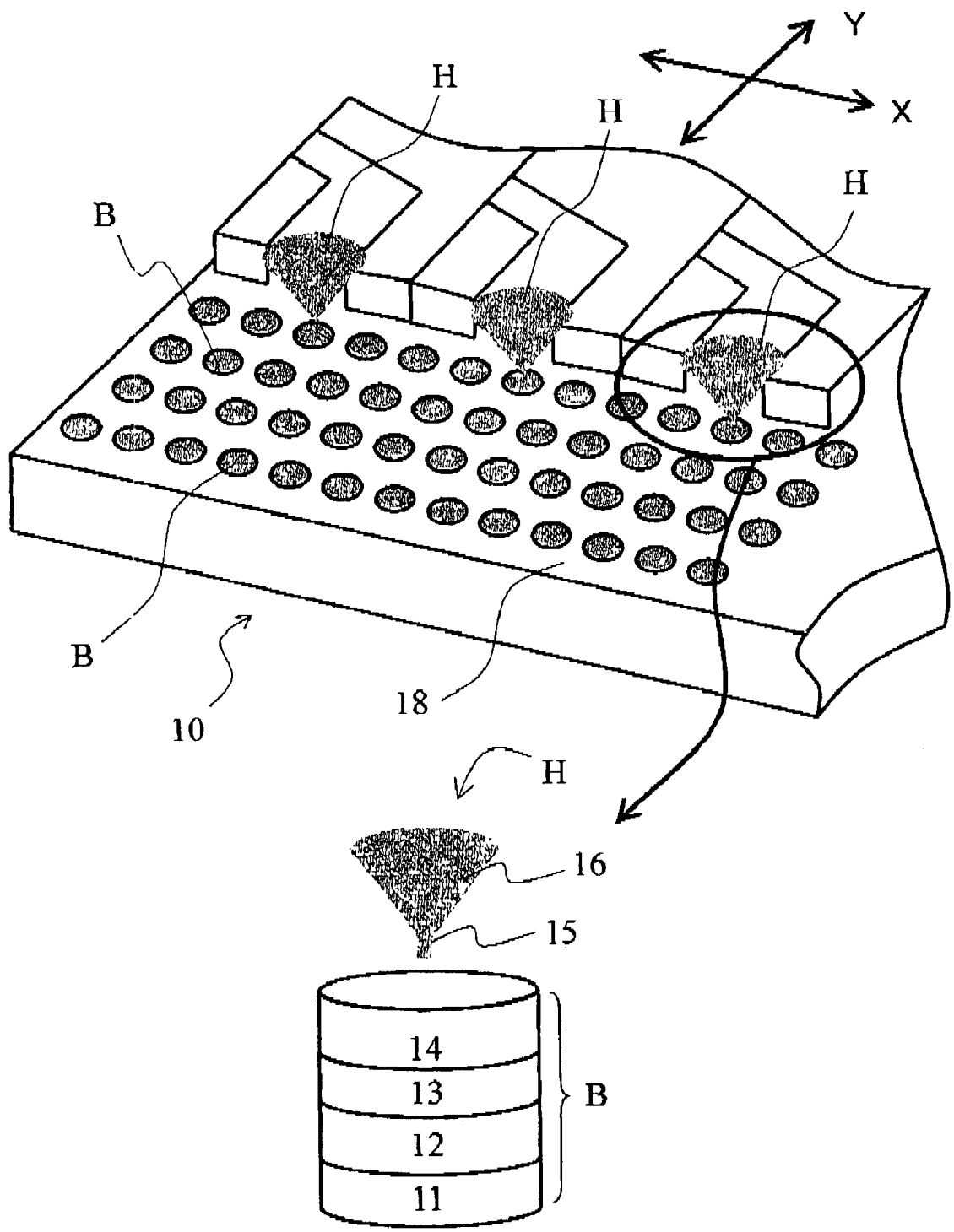
FIG. 17 is a perspective diagram which illustrates the outline structure of a magnetic record reproducing apparatus of the example.

FIG. 17 is a perspective diagram which illustrates the outline structure of a magnetic record reproducing apparatus of the example. In the magnetic record reproducing apparatus of this example, access by two or more probes is enabled to the recording medium which has a puttered structure.

That is, the recording medium 10 has the structure where puttering was carried out by the separation region 18, and the recording bits B are arranged in a matrix fashion. Each recording bit B has the laminated structure including the electrode layer 11, the recording layer 12, the intermediate layer 13, and the high-polarized spin control layer 14, as shown in the enlarged view in the figure.

Also in this example, a recording medium 10 may be of so-called "fixed type" with which the magnetic record reproducing apparatus was equipped regularly, or may be of so-called "removable type".

The multi-head part which has two or more probe type heads H is arranged on such a recording medium 10. The probe type head H has the structure where the probe 15 which supplies current, and the magnetic head 16 which impresses a magnetic field are integrated. Two or more heads H which have such structure are arranged in a pitch of the recording bits B of the medium, or in a pitch of the integral multiple pitch of the recording bits B. Although the probe type heads H illustrated the multi-head part arranged by one sequence in the x direction is shown in FIG. 17, the invention is not limited to this specific example. The probe type heads H may also be arranged in the directions of x and y in a matrix fashion.

Parallel translation of such a multi-head part is carried out in the directions of x and y relative to the recording medium 10, and thus the access of it to a predetermined record bit is enabled. In this case, a multi-head part may move or a recording medium 10 may move. Moreover, the current may be supplied to the medium 10 by cold emission or tunneling in the state where the tip of a probe 15 is separated from the medium 10. Alternatively, the probe 15 may contact the recording medium 10 on the occasion of writing.

According to this example, record reproduction operation can be carried out at high speed to the overly high-density recording medium which has a puttered structure by accessing by a multi-head To the recording medium in this way.

Heretofore, embodiments of the invention have been explained in detail with reference to some specific examples. The invention, however, is not limited to these specific examples.

For example, material, shape and detailed structure of the probe 15 and the magnetic head 16 of the magnetic recording apparatus according to the invention may be appropriately selected by those skilled in the art within the known techniques to carry out the invention as taught in the specification and obtain equivalent effects.

Further, also concerning the magnetic recording layer 12 and the spin controlling layer 14 of the magnetic recording apparatus according to the invention, those skilled in the art will be able to carry out the invention by appropriately selecting a material or a structure within the known techniques.

It will be also appreciated that the invention is applicable not only to magnetic recording apparatus of the lengthwise recording type but also to those of the perpendicular magnetic recording type and ensures substantially the same effects.

The magnetic recording apparatus according to the embodiment of the invention may be of a so-called fixed type incorporating a particular recording medium in a fixed fashion, or of a so-called "removable" type permitting recording mediums to be loaded and unloaded.

While the present invention has been disclosed in terms of the embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A magnetic recording apparatus, comprising:
   a magnetic field impression unit that impresses a magnetic field to a magnetic recording medium;
   a current supplying unit that supplies a current to the magnetic recording medium; and
   a controlling unit that makes the current supplying unit supply the current to the magnetic recording medium while making the magnetic field impression unit impress the magnetic field to at least a unit of a magnetic recording unit of the magnetic recording medium, to thereby record information magnetically by making a direction of a magnetization of the magnetic recording unit of the magnetic recording medium in a predetermined direction, wherein the magnetic recording medium includes a first magnetic layer, and a second magnetic layer as the magnetic recording unit, the magnetic field impression unit directs a magnetization of the first magnetic layer by impressing the magnetic field to the first magnetic layer, and the current supplying unit directs a magnetization of the second magnetic layer in a direction corresponding to a direction of the magnetization of the first magnetic layer by supplying a spin-polarized current to the second magnetic layer through the first magnetic layer.

2. A magnetic recording apparatus according to claim 1, wherein the current supplying unit has a probe made of a conductor or a semiconductor.

3. A magnetic recording apparatus according to claim 1, wherein a range within where the magnetization of the first layer is directed by the magnetic field impressed by the magnetic field impression unit is wider than a range within where the magnetization of the second magnetic layer is directed in accordance to the magnetization of the first magnetic layer by the current supplied by the current supplying unit.

4. A magnetic recording apparatus according to claim 1, wherein the information magnetically recorded in the second magnetic layer is read by detecting a magnetoresistance between the first and second magnetic layers by measuring a change in current passing through the first and second magnetic layers while impressing the magnetic field to the first magnetic layer by the magnetic field impression unit and thereby directing the magnetization of the first magnetic layer.

5. A magnetic recording apparatus according to claim 1, wherein the magnetic field impressed to the magnetic recording medium by the magnetic impression unit does not substantially change the direction of the magnetization of the second magnetic layer.

6. A magnetic recording apparatus according to claim 1, wherein the magnetic field impression unit impresses the magnetic field to the magnetic recording medium at the same time or before the current supplying unit supplies the current to the magnetic recording medium.

7. A magnetic recording apparatus comprising:

a magnetic recording medium having a first magnetic layer and a second magnetic layer;

a magnetic field impression unit that impresses a magnetic field to the first magnetic layer;

a current supplying unit that supplies a current to the second magnetic layer through the first magnetic layer; and a controlling unit that makes the current supplying unit supply the current to the second magnetic layer through the first magnetic layer while making the magnetic field impression unit impress the magnetic field to the first magnetic layer to direct a magnetization of the first magnetic layer in a predetermined direction, thereby making a direction of a magnetization of the second magnetic layer in a direction corresponding to the direction of the magnetization of the first magnetic layer.

8. A magnetic recording apparatus according to claim 7, wherein the magnetic recording medium further have a non-magnetic layer interposed between the first and the second magnetic layers.

9. A magnetic recording apparatus according to claim 8, wherein the non-magnetic layer is made of copper and has a thickness between 2 nm and 10 nm.

10. A magnetic recording apparatus according to claim 7, wherein the magnetic recording medium has a structure where a plurality of recording unit regions are two-dimensionally arranged, each of the recording unit regions are separated by a separation region, and each of the recording unit regions having the first and the second magnetic layers.

11. A magnetic recording apparatus according to claim 7, wherein the coercive force of the first magnetic layer is smaller than a coercive force of the second magnetic layer.

12. A magnetic recording apparatus according to claim 7, wherein the current supplying unit has a probe made of conductor or semiconductor.

13. A magnetic recording apparatus according to claim 7, wherein a range within where the magnetization of the first layer is directed by the magnetic field impressed by the magnetic field impression unit is wider than a range within where the magnetization of the second magnetic layer is directed in accordance to the magnetization of the first magnetic layer by the current supplied by the current supplying unit.

14. A magnetic recording apparatus according to claim 7, wherein the information magnetically recorded in the second magnetic layer is read by detecting a magnetoresistance between the first and second magnetic layers by measuring a change in current passing through the first and second magnetic layers while impressing the magnetic field to the first magnetic layer by the magnetic field impression unit and thereby directing the magnetization of the first magnetic layer.

15. A magnetic recording apparatus according to claim 14, wherein the current supplied to the magnetic recording medium to record the information is larger than the current supplied to the magnetic recording medium to read the information.

16. A magnetic recording apparatus according to claim 7, wherein the magnetic field impressed to the magnetic recording medium by the magnetic impression unit does not substantially change the direction of the magnetization of the second magnetic layer.

17. A magnetic recording apparatus according to claim 7, wherein the magnetic field impression unit impresses the magnetic field to the magnetic recording medium at the same time or before the current supplying unit supplies the current to the magnetic recording medium.

18. A magnetic recording method comprising:

impressing a magnetic field to a first magnetic layer to direct a magnetization of the first magnetic layer;

supplying a current to a second magnetic layer of the magnetic recording medium through the first magnetic layer; and making a direction of a magnetization of the second magnetic layer in a direction corresponding to the direction of the magnetization of the first magnetic layer thereby recording information magnetically.

19. A magnetic recording method according to claim 18, wherein the current is supplied through a probe made of a conductor or a semiconductor adjoining the magnetic recording medium.

* * * * *